(12) United States Patent
Ota

(10) Patent No.: US 9,014,599 B2
(45) Date of Patent: Apr. 21, 2015

(54) ROTATION TRANSMISSION UNIT, REPLACEMENT UNIT, DEVELOPER CONTAINER AND IMAGE FORMING APPARATUS

(75) Inventor: Atsushi Ota, Tokyo (JP)

(73) Assignee: Oki Data Corporation, Tokyo (JP)

( * ) Notice: Subject to any disclaimer, the term of this patent is extended or adjusted under 35 U.S.C. 154(b) by 190 days.

(21) Appl. No.: 13/527,624

(22) Filed: Jun. 20, 2012

(65) Prior Publication Data

US 2012/0328336 A1 Dec. 27, 2012

(30) Foreign Application Priority Data

Jun. 24, 2011 (JP) .................................. 2011-141007

(51) Int. Cl.
| | | |
|---|---|---|
| G03G 21/18 | (2006.01) | |
| F16D 1/116 | (2006.01) | |
| G03G 15/00 | (2006.01) | |
| G03G 21/16 | (2006.01) | |
| G03G 15/08 | (2006.01) | |
| F16D 1/10 | (2006.01) | |

(52) U.S. Cl.
CPC ............ *F16D 1/116* (2013.01); *Y10T 403/7075* (2015.01); *G03G 15/0875* (2013.01); *G03G 21/1857* (2013.01); *G03G 2215/085* (2013.01); *F16D 2001/102* (2013.01); *G03G 15/757* (2013.01); *G03G 21/1647* (2013.01); *G03G 21/186* (2013.01)

(58) Field of Classification Search
CPC ......... F16D 1/108; F16D 1/112; F16D 1/116; F16D 2001/102; G03G 21/186; G03G 21/1647; G03G 15/757; G03G 21/1857; G03G 2215/085; G03G 15/0875

USPC .......... 403/375, 383, 329, 326; 399/110, 111, 399/167, 256, 265, 279, 286; 74/431, 434, 74/438

See application file for complete search history.

(56) References Cited

U.S. PATENT DOCUMENTS

| | | | | |
|---|---|---|---|---|
| 4,778,303 | A | * | 10/1988 | Mullins |
| 5,845,175 | A | * | 12/1998 | Kumar et al. ................. 399/111 |
| 6,208,817 | B1 | * | 3/2001 | Chadani et al. |
| 6,322,282 | B1 | * | 11/2001 | Kussman et al. ............. 403/329 |
| 6,490,426 | B1 | * | 12/2002 | Zaman .......................... 399/167 |
| 2001/0021328 | A1 | * | 9/2001 | Nishiuwatoko |
| 2011/0217073 | A1 | * | 9/2011 | He ................................. 399/111 |

FOREIGN PATENT DOCUMENTS

| | | |
|---|---|---|
| JP | 2002-327770 A | 11/2002 |
| JP | 2006-113154 A | 4/2006 |
| JP | A-2006-112467 | 4/2006 |
| JP | 2007-321780 A | 12/2007 |

* cited by examiner

*Primary Examiner* — David Gray
*Assistant Examiner* — Laura Roth
(74) *Attorney, Agent, or Firm* — Muncy, Geissler, Olds & Lowe, P.C.

(57) ABSTRACT

A rotation transmission unit includes a driving unit that provides a rotational power; a rotation transmission member that is rotated due to reception of the rotational power transmitted from the driving unit; a rotation member that is rotated due to reception of a rotation of the rotation transmission member; a locking groove that is formed at one of the rotation transmission member and the rotation member; and a locking member that is arranged at the other of the rotation transmission member and the rotation member. A surface of the locking member on the locking groove side is flat.

22 Claims, 17 Drawing Sheets

ROTATION TRANSMISSION UNIT, REPLACEMENT UNIT, DEVELOPER CONTAINER AND IMAGE FORMING APPARATUS

CROSS REFERENCE TO RELATED APPLICATION

The present application is related to, claims priority from and incorporates by reference Japanese Patent Application No. 2011-141007, filed on Jun. 24, 2011.

TECHNICAL FIELD

The present application relates to a rotation transmission unit, a replacement unit, a developer container and an image forming apparatus.

BACKGROUND

Conventionally, among image forming apparatuss, such as printers, photocopy machines, facsimile devices, multifunction peripherals and the like, a printer, for example, includes an image forming unit, a light emitting diode (LED) head, a transfer roller and a fuser. The image forming unit is composed of a body of the image forming unit and a toner cartridge as a developer container in which a toner is accommodated and as a replacement unit that is detachably arranged to the image forming unit main body. A photosensitive drum, a charging roller, a development roller, a toner supply roller, a cleaning blade, and the like are arranged within the image forming unit main body.

In the above-described printer, a surface of the photosensitive drum that is uniformly charged by the charging roller is exposed by the LED head, and thereby, an electrostatic latent image is formed. The electrostatic latent image is developed by the development roller, and then, a toner supplied from the toner cartridge is attached to the electrostatic latent image. As a result, a toner image is formed. Then, the toner image is transferred to a sheet by the transfer roller and is fused onto the sheet by the fuser.

Further, in the printer, a toner agitation mechanism for agitating toner is arranged in the image forming unit, the toner cartridge, and the like, such as in a predetermined section within the toner cartridge. The toner agitation mechanism includes a toner agitation bar as a rotation member arranged to be freely rotatable. A motor arranged in the image forming unit main body and the agitation drive gear as a rotation transmission member mounted to a rotation shaft of the toner agitation bar are linked via a rotation transmission system, such as a gear train and the like. As a result, the rotation from the motor is transmitted to the agitation drive gear and is further transmitted to the toner agitation bar. Thereby, the toner agitation bar is rotated.

A rotation transmission unit that freely disengageably engages the agitation drive gear and the toner agitation bar with each other is provided.

In the rotation transmission unit, a D-cut surface is formed at the end of the rotation shaft of the toner agitation bar, and a locking groove is formed on an outer peripheral surface at the end of the rotation shaft. A "D"-shaped insertion hole for inserting the end of the rotation shaft is formed in the center of the agitation drive gear, and a snap fit part that is formed with a predetermined curvature and that has elasticity is formed along an arc surface of the insertion hole. Therefore, when the end of the rotation shaft is inserted into the insertion hole, the snap fit part is elastically deformed, and a locking protrusion of the snap fit part and the locking groove are locked. As a result, the agitation drive gear and the toner agitation bar are engaged with each other (for example, see JP Laid-Open Patent Application No. 2006-112467).

However, in the conventional rotation transmission unit, if the locking protrusion of the snap fit part is small, the toner agitation bar may come off from the agitation drive gear when an external force is applied due to vibration or impact in a direction in which the rotation shaft is disengaged from the insertion hole, after the locking protrusion and the locking groove are locked.

Then, it can be considered increasing the locking protrusion in size. However, the snap fit part is formed with a predetermined curvature along the arc surface of the insertion hole. Therefore, if the size of the locking protrusion increases, the rigidity of the snap fit part becomes extremely high, and it becomes difficult to elastically deform the snap fit part. As a result, the workability at the time of engaging the agitation drive gear with the tonner agitation bar becomes low.

An object of the present invention is to provide a rotation transmission unit that resolve one of the above-described problems of the conventional rotation transmission unit, and that prevent a rotation member from disengaging from a rotation transmission member.

SUMMARY

Considering of the objects, a rotation transmission unit of the invention includes a driving unit that provides a rotational power, a rotation transmission member that is rotated due to reception of the rotational power transmitted from the driving unit, a rotation member that is rotated due to reception of a rotation of the rotation transmission member., A locking groove is formed at one of the rotation transmission member and the rotation member.

A locking member is arranged at the other of the rotation transmission member and the rotation member.

And a surface of the locking member on the locking groove side is formed to be plane.

In this case, since the surface of the locking member on the locking groove side is formed plane,, it prevents the rotation member from disengaging from the rotation transmission member.

In another view, a replacement unit of the invention includes the rotation transmission unit above.

In another view, a developer container of the invention includes the rotation transmission unit above.

In another view, an image forming device of the invention includes the developer container above.

DETAILED DESCRIPTION OF EMBODIMENTS

Hereafter, embodiments of the present application are explained in detail with reference to drawings. A printer is explained as an image forming apparatus.

Figure 1:
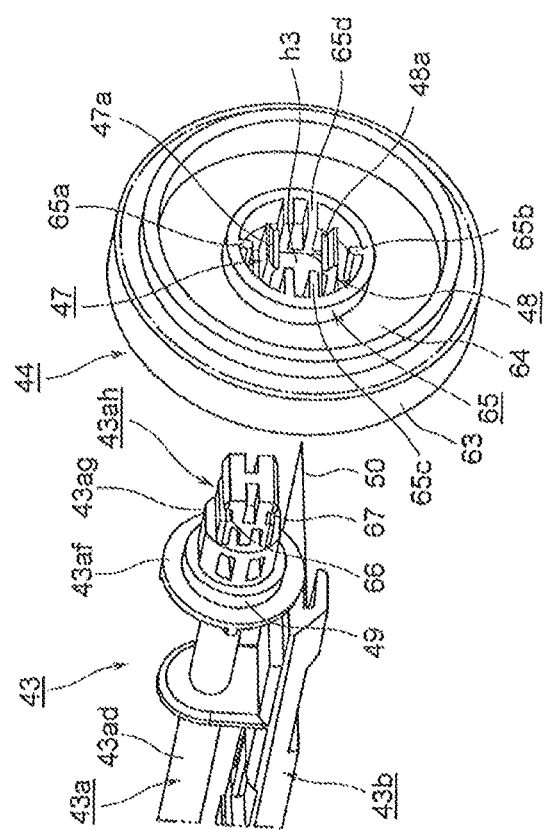
FIG. 1 is an exploded perspective view of a rotation transmission unit in a first embodiment of the present application.
Figure 2:
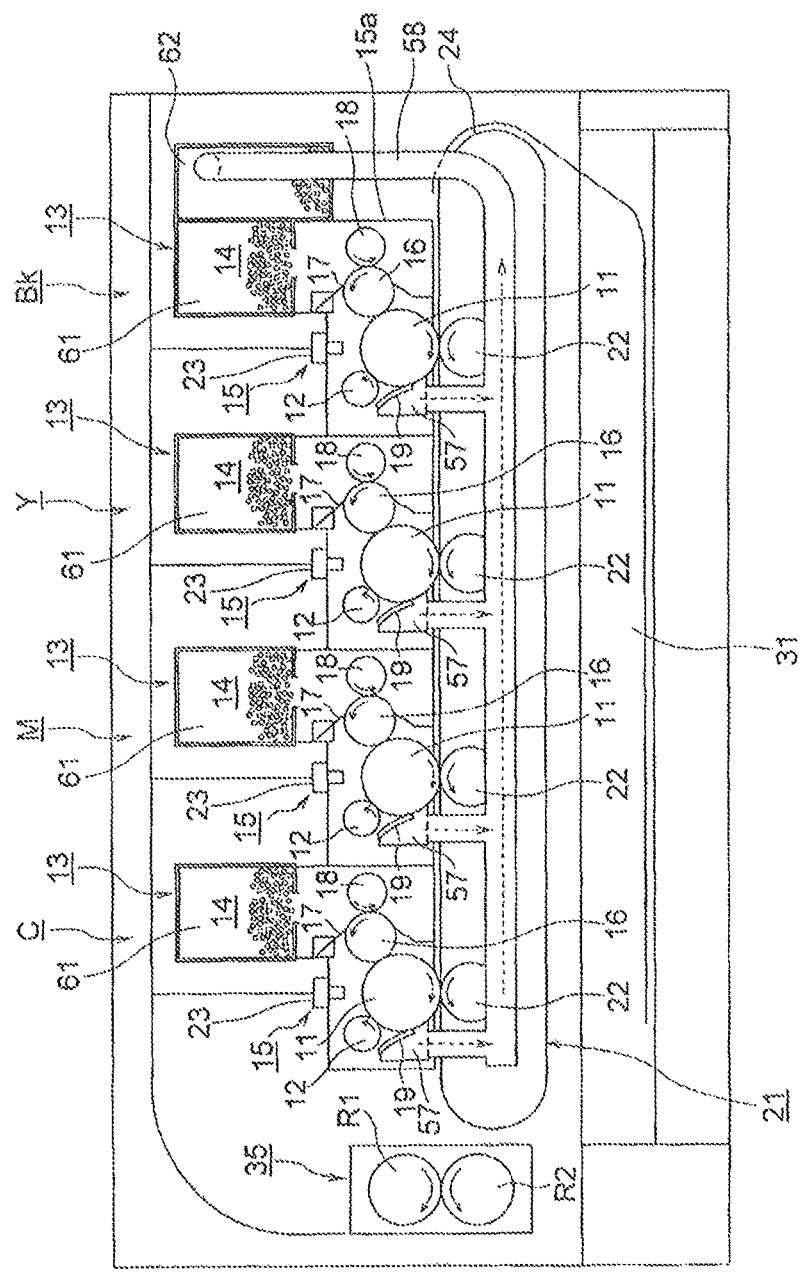
FIG. 2 is a conceptual diagram of a printer in the first embodiment of the present application.

FIG. 2 is a conceptual drawing of a printer in a first embodiment of the present application.

As shown in the drawings, image forming parts Bk, Y, M and C are arranged for respective toners 14 as developers of colors of black, yellow, magenta and cyan, within the printer, and a transfer unit 21 as a transfer part is arranged along the image forming parts Bk, Y, M and C. Each of the image forming parts Bk, Y, M and C includes an image forming unit 15 as a first replacement unit that is arranged detachably from a printer body, i.e., an device main body, and a light emitting diode (LED) head 23 as an exposure device arranged by corresponding to the image forming unit 15, respectively.

A sheet supply cassette 31 as a medium accommodation part, where sheets (not shown) as media are accommodated, is arranged under the transfer unit 21. The sheets are fed from the sheet supply cassette 31 one by one, and are sent between each of the image forming parts Bk, Y, M and C and the transfer unit 21.

Each image forming unit 15 includes a main body for the image forming unit 15, i.e., an image forming unit main body 15a, and a toner cartridge 13 as a second replacement unit and as a developer container that is arranged detachably from the image forming unit main body 15a, and the toner 14 is accommodated in a toner accommodation part 61 as a developer accommodation part formed within the toner cartridge 13. Furthermore, the toner cartridge 13 can be replaced with a new cartridge 13 when the toner 14 is consumed or when a component is deteriorated.

Each image forming unit main body 15a includes a photosensitive body (e.g., drum 11) as an image carrier that is formed in a drum shape, which surface is formed with an organic photosensitive body, and that supports an electrostatic latent image as a latent image. In addition, the image forming unit main body 15a includes a charging roller 12 as a charging device that is arranged around the photosensitive drum 11 by abutting the photosensitive drum 11, and that uniformly charges a surface of the photosensitive drum 11; a development roller 16 as a developer carrier that develops the electrostatic latent image formed on the surface of the photosensitive drum 11, and that forms a toner image as a developer image; a developing blade 17 as a developer regulating member that forms a thin layer of the toner 14 on the surface of the development roller 16; a toner supply roller 18 as a developer supply member that supplies the toner 14 supplied from he toner cartridge to the development roller 16; and a cleaning blade 19 as a cleaning member. Furthermore, a development unit as a development device is configured from the development roller 16, the developing blade 17 and the toner supply roller 18.

Then, when a drive motor as a driving unit is driven to provide a rotational power and rotation due to the rotational power is transmitted by a (not shown) gear, the photosensitive drums 11 are rotated at constant peripheral velocity, and the charging rollers 12, the development rollers 16 and the toner supply roller 18 are rotated in an arrow direction in association with the rotation. In FIG. 2, the drive motor is a part of the image forming unit 15

In the image forming unit 15 with the above-described configuration, the surface of the photosensitive drum 11 uniformly charged by the charging roller 12 is exposed by the LED head 23, and an electrostatic latent image is formed. Then, the toner 14 is attached to the electrostatic latent image by the development roller 16 and development is performed, and a toner image is formed.

The transfer unit 21 includes a transfer belt 24 as a belt member that abuts each photosensitive drum 11 and is travelably stretched, and transfer rollers 22 as transfer members that are arranged to face respective photosensitive drums 11 across the transfer belt 24. The transfer rollers 22 sequentially transfer the toner images of the respective colors on the photosensitive drums 11 by overlapping the toner images onto the sheet that is sent from the sheet supply cassette 31 and that is carried in accordance with the traveling of the transfer belt 24, and forms a color toner image.

Furthermore, after the transfer, the toner 14 remaining on the surface of the photosensitive drum 11 is wiped out and removed by the cleaning blade 19.

A fuser 35 as a fusing device is arranged at the downstream side from the image forming parts Bk, Y, M and C in the sheet carrying direction. The fuser 35 includes a fusion roller R1 as a first roller and a pressure application roller R2 as a second roller. The fuser 35 fuses the color toner images on the sheet sent from the image forming parts Bk, Y, M and C, and forms a color image. Then, the sheet on which the color image has been formed is ejected to outside of the device main body.

Furthermore, the photosensitive drums 11, the charging rollers 12, the LED heads 23, the development rollers 16, the toner supply rollers 118, the transfer rollers 22 and the fuser 35 are controlled by a controller (not shown). The controller applies direct current voltage to the charging rollers 12, the development rollers 16, the toner supply rollers 18 and the transfer rollers 22 at a preset timing, and rotates the photosensitive drums 11, the charging rollers 12, the development rollers 16, the toner supply rollers 18 and the fusion roller R1 in an arrow direction by driving the drive motor.

Then, first carrying parts 57 carry the toners 114 wiped by the cleaning blades 19 as waste toners in the longitudinal direction of the image forming parts Bk, Y, M and C (an axial direction of the photosensitive drums 11) toward the front side in the drawing, respectively. Further, a second carrying part 58 carries the waste toner of each color carried by the first carrying parts 57 to a waste toner container 62 as a waste developer container arranged at the most upstream side in the carrying direction of sheets, collectively. The waste toner container 62 contains the waste toners carried by the second carrying part 58.

Next, the toner cartridges 13 are explained with references to FIGS. 1 to 9.

As shown in the drawings, each toner cartridge 13 includes a cartridge main body 40 as a developer accommodation part main body in which the toner accommodation part 61 is formed; an operation lever 42 as an operation part that is rotatably supported by the cartridge main body 40; a toner agitation bar 43 as an agitation member and as a rotation member that is rotatably arranged within the cartridge main body 40 and that agitates the toner 14 accommodated within the toner accommodation part 61 in association with the rotation; an agitation drive gear 44 as a rotation transmission member; a sealing member 45 made from an elastic member, such as sponge, for preventing the toner 14 within the toner accommodation part 61 from leaking to the outside, and the like. Further, in order to seal a space to be formed at an abutting section, slide section and the like between (not shown) predetermined components, another sealing member made from an elastic member, such as a sponge.

The agitation drive gear 44 is linked to a motor as a driving unit, which provides a rotational power, arranged at a predetermined section of the image forming unit main body 15a via a rotation transmission system, such as a gear train (not shown) and the like, and is rotated due to the reception of the rotation from the motor. Furthermore, as the motor, a drive motor for rotating the photosensitive drums 11 may be used.

The rotation transmission unit is formed with the agitation drive gear 44 and the toner agitation bar 43. The rotation of the agitation drive gear 44 is transmitted to the toner agitation bar 43 by engaging the agitation drive gear 44 with the toner agitation bar 43, and thereby, the toner agitation bar 43 is rotated.

The cartridge main body 40 includes a case 40a made from a cylinder body. One end of the case 40a is closed by the operation lever 42, and the other end is closed by a side cover 40b as a cover body. Further, a plurality of toner discharge openings 40c for supplying (discharging) the toners 14 within the toner accommodation parts 61 to the image forming unit main body 15a are formed at the lower end part of the case 40a adjacently in the longitudinal direction.

Further, the operation lever 42 has functions to open/close the toner discharge openings 40c and to engage/disengage the toner cartridge 13 with/from the image forming unit main body 15a by rotating within the range of a rotational angle θ. Consequently, the operation lever 42 includes a main body part 42a that has circular shape and that closes one end of the case 40a; an operation strip 42b as a handle part that is formed by protruding outwardly in a radial direction from the predetermined section of the main body part 42a; a ring-shape fixation locking part 42c as a second locking part for engagement/disengagement that is formed in the center of the main body part 42a, and that is selectively locked with a rib 41 as a first locking part for engagement/disengagement that is formed in the image forming unit main body 15a; and a cylinder part 46 that is formed by extending in the longitudinal direction of the toner accommodation part 61 from the main body part 42a.

An accommodation chamber 42ar, of which the lower part is opened, and that has horseshoe configuration, and in which the agitation drive gear 44 is accommodated, is formed in the main body part 42a. The agitation drive gear 44 is engaged with the toner agitation bar 43 within the accommodation chamber 42ar. Further, the accommodation chamber 42ar is surrounded by a first wall part w1 at the cylinder part 46 side and by a second wall part w2 at the opposite side from the cylinder part 46. An axial support hole h1 as a bearing element for rotatably supporting one end of the toner agitation bar 43 is formed on the first wall part w1, and a release operation hole h2 for inserting an operation tool, such as a slotted screwdriver (not shown) and the like, by an operator when the engagement of the agitation drive gear 44 with the toner agitation bar 43 is to be released, is formed on the second wall part w2.

Furthermore, the other end of the toner agitation bar 43 is rotatably supported by a bearing part 40d as a bearing element formed on the side cover 40b. Then, the sealing member 45 is secured by abutting the surface of the first wall part w1 at the cylinder part 46 side, and seals the space between the axial support hole h1 and the toner agitation bar 43.

The fixation locking part 42c includes a groove 42d for allowing the rib 41 to enter into the fixation locking part 42c at the predetermined section in the circumferential direction, and allows the rib 41 to enter into the fixation locking part 42c via the groove 42d at the time of mounting the toner cartridge 13 to the image forming unit main body 15a. Thereafter, when the operation lever 42 is rotated, the rib 41 and the fixation locking part 42c are engaged with each other, and the toner cartridge 13 is secured to the image forming unit main body 15a.

Further, the cylinder part 46 has a cylindrical configuration. A plurality of passage holes 46a for allowing the toners 14 within the toner accommodation parts 61 to pass through are formed in the upper side of the cylinder part 46 adjacently in the longitudinal direction, and a plurality of discharging holes 46b for discharging the toners 14 within the toner accommodation parts 61 are formed in the lower side of the cylindrical part 46 adjacently in the longitudinal direction. When the operation lever 42 is rotated and when the toner cartridge 13 is secured to the image forming unit main body 15a, the toner discharge openings 40c and the discharge holes 46b are in communication with each other. Therefore, the toner 14 within the toner accommodation parts 61 drops into the image forming unit main body 15a.

The toner agitation bar 43 includes an rotation shaft 43a; a sheet grip part 43b as a slide body retaining part that is formed integrally with the rotation shaft 43a and by extending in the longitudinal direction along the rotation shaft 43a, and that spins around the periphery of the rotation shaft 43a in association with the rotation of the rotation shaft 43a; and an agitation sheet 50 made of a resin with flexibility that is retained by the sheet grip part 43b. When the sheet grip part 43b spins, the tip of the agitation sheet 50 slides on the inner wall of the case 40a. Furthermore, the rotation shaft 43a and the sheet grip part 43b may be separately formed.

The rotation shaft 43a includes an axial body part 43ad, a rotation shaft end part 43ae as a first supported part, a disc-shape sealing part 43af, a ring-shape part 49, a cylindrical rotation shaft end part 43ag as a second supported part, a fitting part 43ah, and the like. The rotation shaft, end part 43ae is formed at the end of the axial body part 43ad at the side cover 40b side by adjoining the rotation shaft 43a and is supported by the bearing part 40d. The disc-shape sealing part 43af is formed in the end of the axial body part 43ad at the main body part 42a side by abutting the sealing member 45, and slides on the sealing member 45 in association with the rotation of the rotation shaft 43a. The ring-shape part 49 is formed in the end at the main body part 42a side farther than the sealing part 43af by adjoining the sealing part 43af. The cylindrical rotation shaft end part 43ag is formed in the end at the main body part 42a side farther than the ring-shape part 49 by adjoining the ring-shape part 49 and is supported by the axial support hole h1. The fitting part 43ah is made from a prismatic column body, is formed in the end at the main body part 42a side farther than the rotation shaft end part 43ag by adjoining the rotation shaft end part 43ag, and is fitted to the agitation drive gear 44.

When diameters of the e sealing part 43af, the ring-shape part 49, the rotation shaft end part 43ag and the body part 43ad are indicates as d1, d2, d3 and d4, respectively, the diameters d1 to d4 are set to be d1>d2>d3>d4.

Further, when the fitting part 43ah is formed to have dimensions to be fitted within the outer periphery of the rotation shaft end part 43ag and to have a rectangular cross-sectional configuration, and when a length of each side in the rectangle is indicated as e1, the relationship d3>e1>d4 is established. Therefore, steps are respectively formed between the sealing part 43af and the ring-shape part 49, between the ring-shape part 49 and the rotation shaft end part 43ag and between the rotation shaft end part 43ag and the fitting part 43ah, respectively. In addition, the fitting part 43 includes four surfaces 43ah-1 to 43 ah-4.

In the present embodiment, the agitation drive gear 44 and the toner agitation bar 43 are disengageably arranged.

Consequently, the agitation drive gear 44 includes a ring-shape boss part 65 arranged in the center portion, a mesh part 63 made from a plurality of teeth (not shown) arranged around the outer periphery, and a hub part (inner wall) 64 formed between the boss part 65 and the mesh part 63. A fitting hole h3 having a triangular shape for fitting the fitting part 43ah is formed inwardly in the radial direction of the boss part 65. A pair of snap fit parts 47 and 48 as locking members are formed to extend axially from the hub part 64, in parallel with each other, and in a tongue shape (flat plate shape) by facing each other, on two inner surfaces s21 and s22 of four inner surfaces s21 to s24 of the fitting hole h3 that face each other, in a cantilever manner to the boss part 65.

The snap fit parts 47 and 48 include flat plate shape main body parts 47c and 48c which surfaces are formed with horizontal surfaces; latch pawls 47a and 48a as first locking elements formed by protruding from the vicinity of the tips on the opposite surfaces of the body parts 47c and 48c; and engagement release parts 47b and 48b that are formed by inclining between the tips on the opposite surfaces of the body parts 47c and 48c and the latch pawls 47a and 48a for releasing the engagement of the agitation drive gear 44 with the toner agitation bar 43, respectively. Furthermore, base edge line parts 47d and 48d with regard to the boss part 65 of the snap fit parts 47 and 48 and base edge line parts 47c and 48c with regard to the engage release parts 47b and 48b of the latch pawls 47a and 48a are respectively linearly formed without any curvature throughout the length of the sides of the rectangle of the fitting hole h3 in the rotational tangent direction of the agitation drive gear 44. In this embodiment illustrated in FIG. 7, the inner surfaces s21 and s22 are referred as surfaces of the locking member on the locking groove side, being flat or plane. The inner surfaces s21 and s22 are arranged to face each other and have an identical length and width. One end of the inner surface s21 corresponds to the base edge line part 48d. The other end of the inner surface s21 corresponds to the base edge line part 48e. The base edge line parts 48d and 48e form a pair of two ends of the inner surface s21, which are parallel, have the same length in the embodiment, and are arranged in a direction orthogonal to the axis of the toner agitation bar 43. In the same manner, one end of the inner surface S22 corresponds to the base edge line part 47d. The other end of the inner surface S22 corresponds to the base edge line part 47e.

On a predetermined surface of the four surfaces of the fitting part 43ah (two surfaces Sa and Sb that are in parallel with each other in the present embodiment), locking grooves 66 and 67 as second locking elements are formed throughout the length of the side of rectangle of the fitting part 43ah in the rotational tangential direction, respectively; and groove surfaces 66a and 67a as bottom surfaces of the locking grooves 66 and 67 are linearly extended without curvature and form flat horizontal surfaces, respectively.

In this case, because the agitation drive gear 44 is made of a resin, the snap fit parts 47 and 48 function as elastic members and are deformably arranged. Therefore, the agitation drive gear 44 and the toner agitation bar 43 are engaged with each other by locking the latch pawls 47a and 48a and the locking grooves 66 and 67 while bending the snap fit parts 47 and 48. In addition, the engagement of the agitation drive gear 44 with the toner agitation bar 43 is released by releasing the locking of the latch pawls 47a and 48a and the locking grooves 66 and 67 while bending the snap fit parts 47 and 48, as the operator applies the operational tool to the engagement release parts 47b and 48b.

Furthermore, regulation parts 65a and 65b for regulating a maximum flexible amount of the snap fit parts 47 and 48 and for preventing the snap fit parts 47 and 48 from becoming damaged are formed in portions of the boss part 65 from the snap fit parts 47 and 48 in the radially outward direction, by protruding toward the snap fit parts 47 and 48. Further, guidance parts (ribs) 65c and 65d for positioning the fitting part 43ah at the time of fitting the fitting part 43ah into the fitting hole h3 are formed on the boss part 65 in the side directions of the snap fit parts 47 and 48 by protrusion.

As shown in FIGS. 23A to 23D, protrusions 145 and 146 may be provided on a fitting part 143ah, and guidance grooves 165c and 165d may be provided in a fitting hole h113. In that case, when the fitting part 143ah is inserted into the fitting hole h113, the protrusions 145 and 146 enter into the guidance grooves 165c and 165d, respectively. Consequently, when the fitting part 143ah is inserted into the fitting hole h113, the fitting part 143ah is prevented from offsetting and entering into the fitting hole h113. For example, the fitting part 143ah is prevented from being inserted into the fitting hole h113 while being offset by 90°.

In the present embodiment, inner surfaces s1 and s2 as locking surfaces at the tip side of the fitting part 43ah in the locking grooves 66 and 67 are formed by being orthogonal to the axis of the toner agitation bar 43, respectively.

Furthermore, the inner surfaces s1 and s2 may be formed by inclining at a predetermined angle α (0°<α≤30°) from the plane orthogonal to the axis of the toner agitation bar 43 toward the rotation shaft end part 43ag side.

Further, outer surfaces s3 and s4 as locking surfaces of the latch pawls 47a and 48a at the tip side of the snap fit parts 47 and 48 are formed by being orthogonal to the axis of the toner agitation bar 43.

Furthermore, the outer surfaces s3 and s4 may be formed by inclining at a predetermined angle β (0°<β≤30°) from the plane orthogonal to the axis of the toner agitation bar 43 toward the tip side.

Therefore, if the tips that are the outermost periphery parts of the inner side surfaces s1 and s2, and the tips that are the outermost periphery parts of the outer side surfaces s3 and s4, form an acute angle by inclining the inner side surfaces s1 and s2 by the angle α and by inclining the outer side surfaces s3 and s4 by the angle β, the latch pawls 47a and 48a and the locking grooves 66 and 67 are reliably locked because a force to clasp the latch pawls 47a and 48a into the locking grooves 66 and 67, even if an external force is applied in the direction in which the agitation drive gear 44 and the toner agitation bar 43 are separated.

Tapered surfaces tp1 and tp2 are formed in the vicinity of the tips of the two surfaces Sa and Sb, and tapered surfaces tp3 and tp4 are formed at the opposite sides from the outer surfaces s3 and s4 of the latch pawls 47a and 47b. Therefore, the fitting part 43ah is easily fitted into the fitting hole h3 by sliding the tapered surfaces tp1 and tp2 onto the tapered surfaces tp3 and tp4.

Next, an assembly method for the rotation transmission unit with the configuration described above is explained with references to FIGS. 10 and 11.

Figure 10:
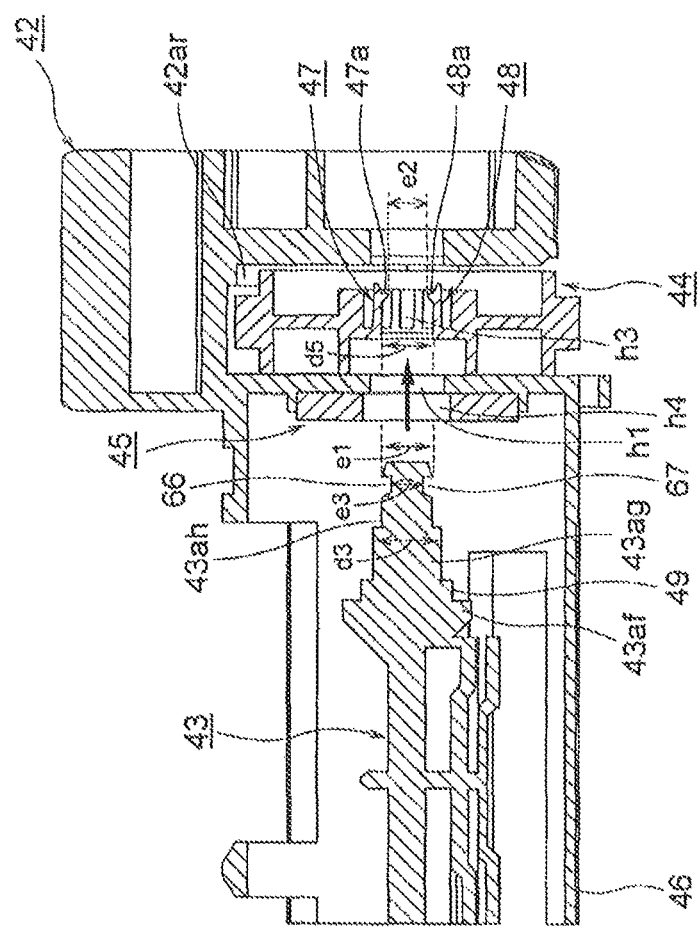
FIG. 10 is a first diagram for explaining an assembly method for the rotation transmission unit in the first embodiment of the present application.

As shown in FIG. 10, when the toner agitation bar 43 moves in the arrow direction within the cylinder part 46 of the operational lever 42, the fitting part 43ah passes through a through-hole h4 and an axial support hole h1 of the sealing member 45 and is fitted into the fitting hole h3 of the agitation drive gear 44. At this time, the latch pawls 47a and 48a and the locking grooves 66 and 67 are locked, and the agitation drive gear 44 is fitted into the toner agitation bar 43.

Figure 11:
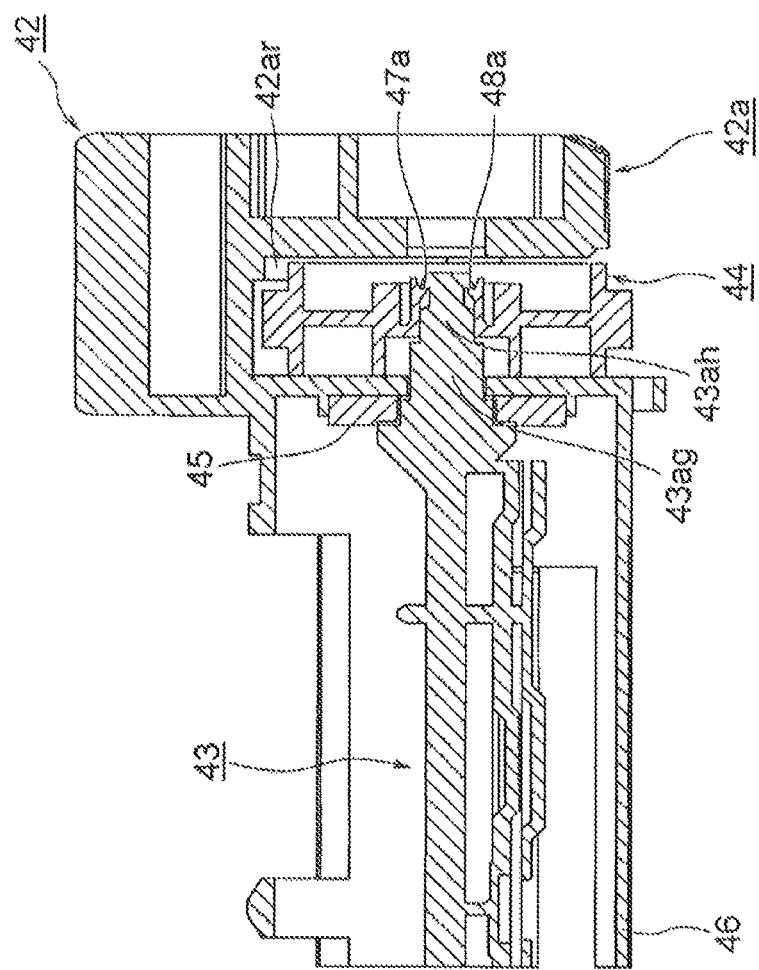
FIG. 11 is a second diagram for explaining the assembly method for the rotation transmission unit in the first embodiment of the present application.
Figure 12:
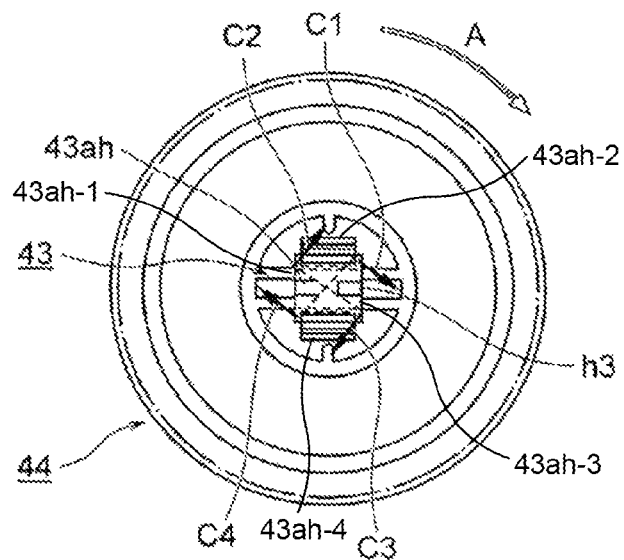
FIG. 12 is a diagram showing a transmission state of rotation by the rotation transmission unit in the first embodiment of the present application.

Further, since a step is formed between the rotation shaft end part 43ag and the fitting part 43ah and because a diameter d3 of the rotation shaft end part 43ag is greater than a diameter d5 of the fitting hole h3, relative movement of the agitation drive gear 44 and the toner agitation bar 43 in the axial direction is regulated, and the toner agitation bar 43 is prevented from moving toward the main body part 42a side from the position shown in FIG. 11.

Furthermore, the length e1 of the side of the rectangle of the fitting part 43ah is equal to or smaller than the length d5 of the side of the rectangle of the fitting hole h3. Further, when the distance between the latch pawls 47a and 48a in the state in which the snap fit parts 47 and 48 are not bent is indicated as e2 and when the distance between the bottom surfaces of the locking grooves 66 and 67 is indicated as e3, the distance e2 is longer than the distance e3 and shorter than the distance e1.

Next, a rotation transmission state by the rotation transmission unit is explained.

As shown in the drawing, rotation axes of the agitation drive gear 44 and the toner agitation bar 43 are determined by the fitting part 43ah and the fitting hole h3 having rectangular shapes, respectively. When the agitation drive gear 44 is rotated to the arrow A direction due to reception of the rotation from the motor, each of the four surfaces of the fitting hole h3 applies rotational forces C1 to C4 to the corresponding one of the four surfaces 43ah-1 to 43ah-4 of the fitting part 43ah. More specifically, on the surfaces 43ah-1 and 43ah-3 of the fitting part 43ah, the guidance parts (ribs) 65c and 65d contact with the surfaces 43ah-1 and 43ah-3.

Thus, the rotation of the agitation drive gear 44 is transmitted to the toner agitation bar 43.

Next, a disassembly method for the rotation transmission unit is explained with reference to FIG. 13.

When the operator inserts the operational tool 100 through a release operation hole h2, attaches the tip of the operational tool 100 to the engagement release parts 47b and 48b and bends the snap fit parts 47 and 48 until the snap fit parts 47 and 48 contact the regulation parts 65a and 65b, the locking of the latch pawls 47a and 48a and the locking grooves 66 and 67 is released. In this state, the engagement of the agitation drive gear 44 with the toner agitation bar 43 is released by moving the toner agitation bar 43 in the arrow E direction.

Thus, in the present embodiment, since the base edge line parts 47d and 48d of the snap fit parts 47 and 48 of the drive agitation gear 44 are linearly extended, the agitation drive gear 44 and the toner agitation bar 43 are locked with a locking width having sufficient strength. In addition, after the latch pawls 47a and 48a and the locking grooves 66 and 67 are locked, the toner agitation bar 43 is prevented from being disengaged from the agitation drive gear 44 even if an external force is applied in a direction in which the fitting part 43ah is detached from the fitting hole h3 due to vibration or impact. Further, the agitation drive gear 44 and the toner agitation bar 43 are locked with a locking area having sufficient strength by linearly forming the groove surfaces 66a and 67a of the locking grooves 66 and 67. Therefore, the toner agitation bar 43 is further prevented from being disengaged from the agitation drive gear 44.

In addition, since the base edge line parts 47d and 48d of the snap fit parts 47 and 48 are early extended, rigidity of the snap fit parts 47 and 48 is lowered, and the snap fit parts 47 and 48 is easily flexibly deformed. As a result, the workability on at the time of engaging/disengaging the agitation drive gear 44 and the toner agitation bar 43 is improved.

Furthermore, if the outer periphery of the fitting part 43ah has curvature configuration and if the groove surface of the locking groove is formed with curvature, it is necessary to increase the snap fit parts 47 and 48 in size so as not to disengage the toner agitation bar 43 from the agitation drive gear 44 even if the external force is applied to the direction in which the fitting part 43ah is detached from the fitting hole h3, after the latch pawls 47a and 48a and the locking grooves are locked. However, if the snap fit parts 47 and 48 are increased in size and if the toner agitation bar 43 is no longer disengaged from the agitation drive gear 44, the rigidity of the snap fit parts 47 and 48 becomes higher, and it becomes difficult to engage/disengage the toner agitation bar 43 and the agitation drive gear 44.

Normally, the toner cartridge 13 that is replaced with a new toner cartridge 13 is recycled and used by filling the toner therein. In the present embodiment, since the agitation drive gear 44 is easily engaged/disengaged with/from the toner agitation bar 43, the workability at the time of recycling the toner cartridge 13 is improved.

In the present embodiment, the latch pawls 47a and 48a are formed in the agitation drive gear 44, and the locking grooves 66 and 67 are formed in the toner agitation bar 43. However, the locking grooves may be formed in the agitation drive gear 44, and the latch pawls may be formed in the toner agitation bar 43.

Next, a second embodiment of the present application is explained with references of FIGS. 14 through 19. Components having the same structure as those in first embodiment are marked with the same symbols. The effects of the disclosure obtained from the same structures are incorporated within the effects of the present embodiment, In the drawings, the symbol 42 is an operational lever as ate operating part; 91 is a toner agitation bar as an agitation member and as a rotation member; and 92 is an agitation drive gear as a rotation transmission member. Furthermore, the rotation transmission unit is formed with the agitation drive gear 92 and the toner agitation bar 91. The rotation of the agitation drive gear 92 is transmitted to the toner agitation bar 91 by engaging the agitation drive gear 92 with the toner agitation bar 91.

Figure 3:
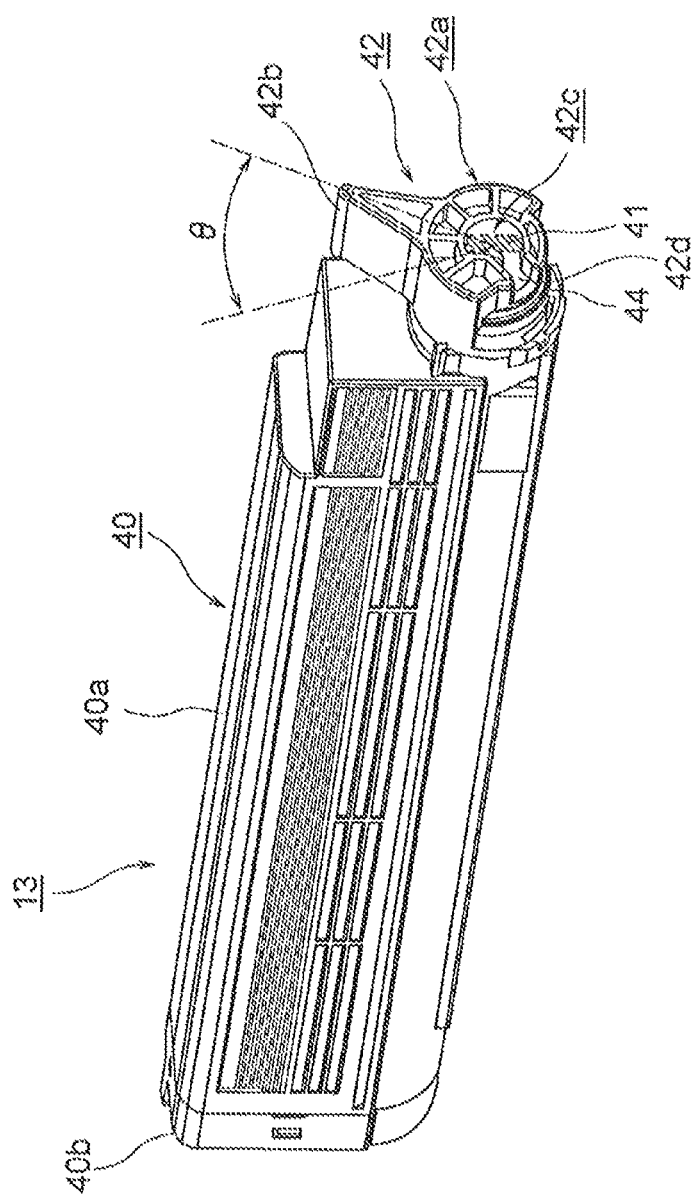
FIG. 3 is a perspective view of a toner cartridge in the first embodiment of the present application.
Figure 4:
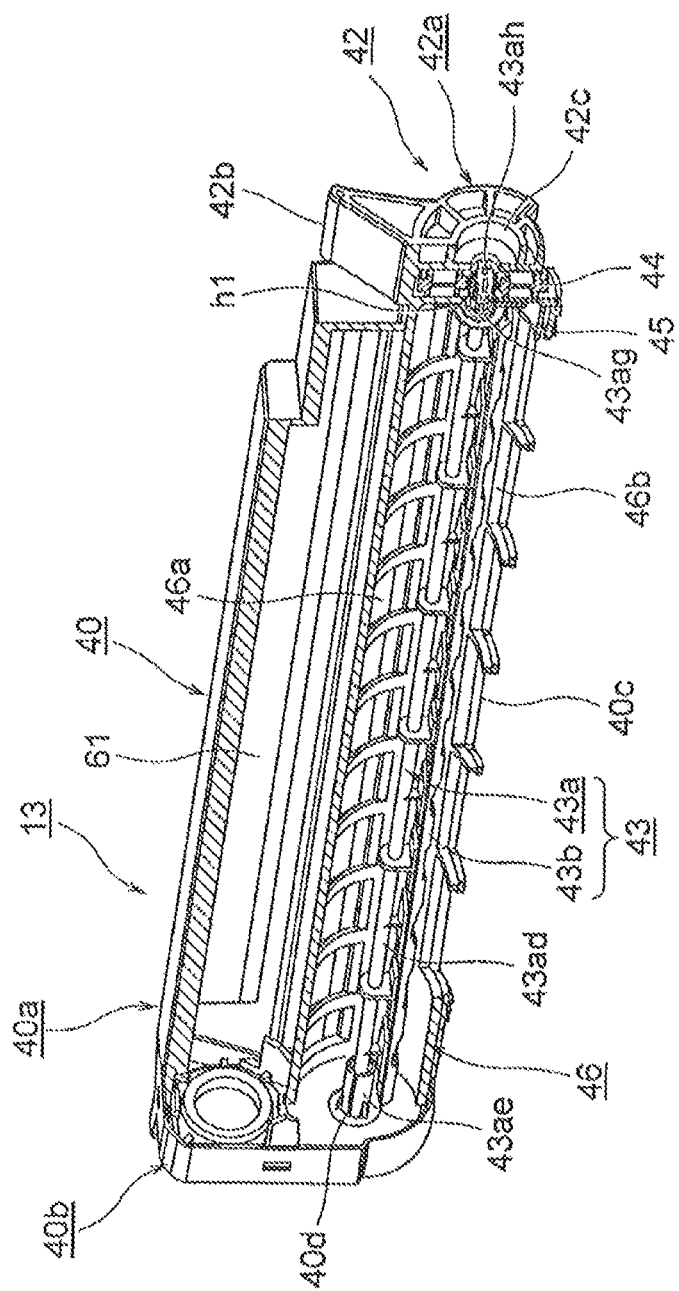
FIG. 4 is a perspective cross-sectional view of the toner cartridge in the first embodiment of the present application.
Figure 5:
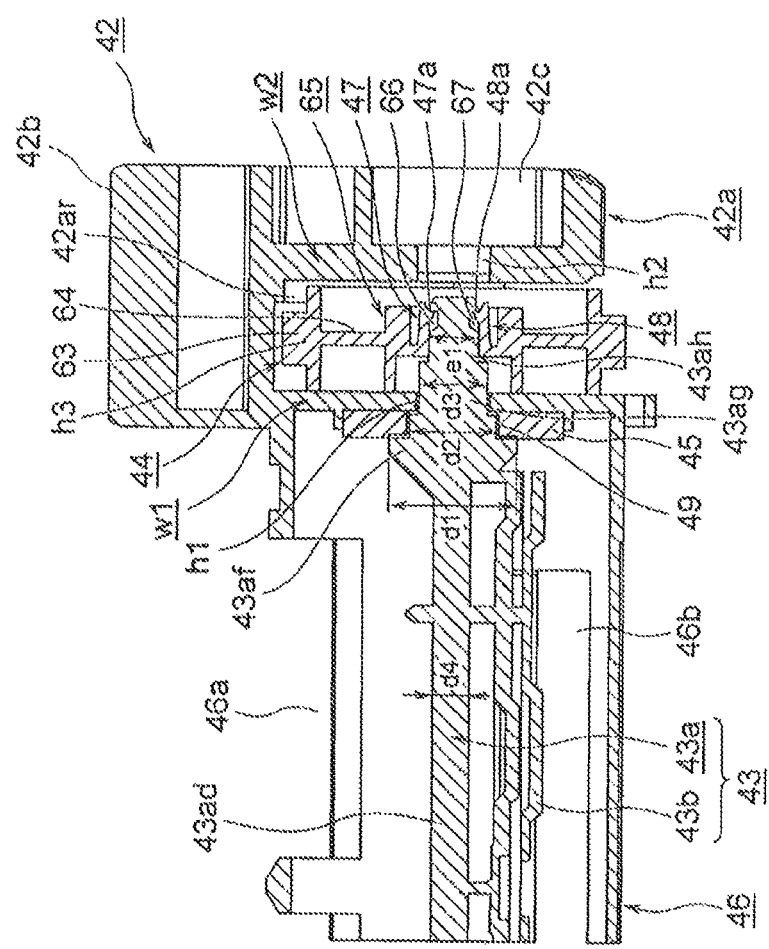
FIG. 5 is a cross-sectional view showing a main part of the toner cartridge in the first embodiment of the present invention.
Figure 6:
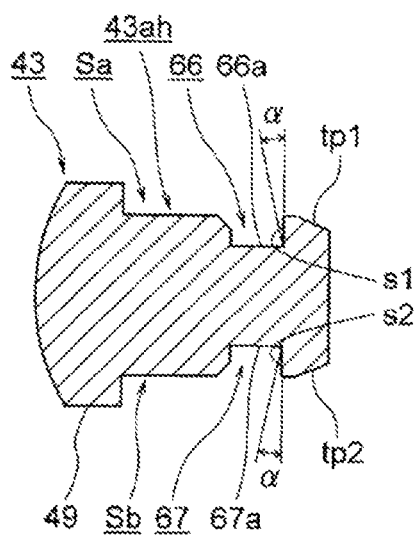
FIG. 6 is a cross-sectional view showing a main part of a toner agitation bar in the first embodiment of the present application.
Figure 7:
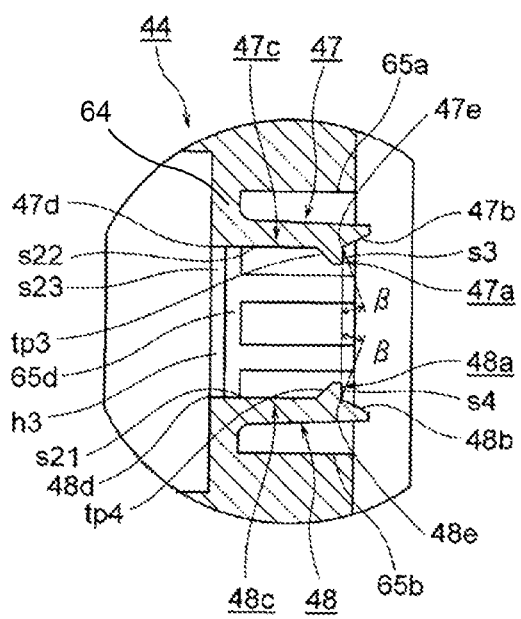
FIG. 7 is a cross-sectional view showing a main part of an agitation drive gear in the first embodiment of the present application.
Figure 8:
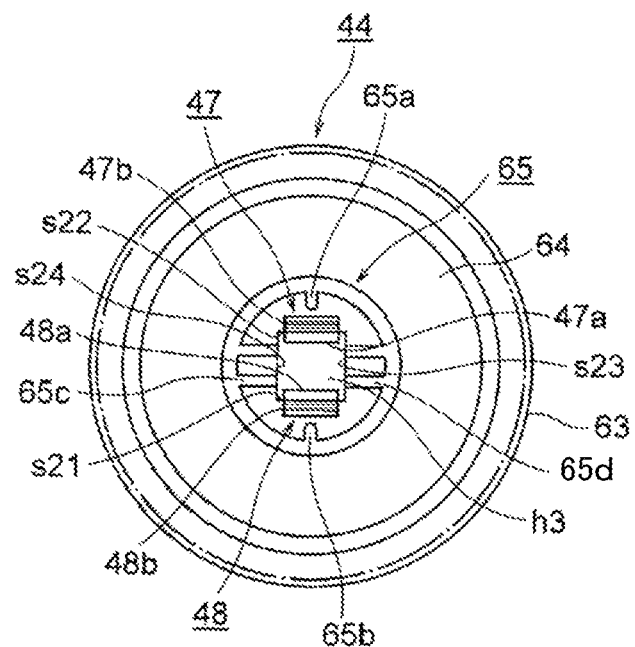
FIG. 8 is a front view of the agitation drive gear in the first embodiment of the present application.
Figure 9:
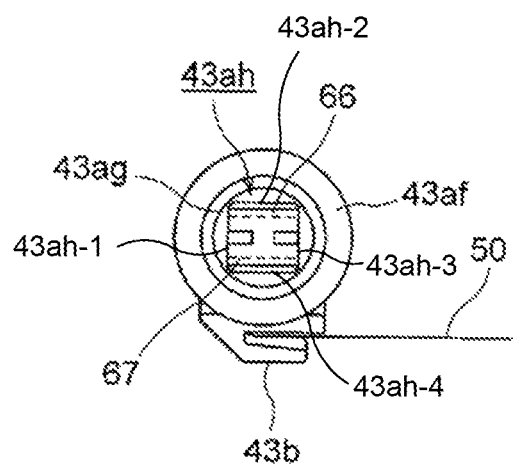
FIG. 9 is a front view showing a main part of a toner agitation bar in the first embodiment of the present application.

The toner agitation bar 91 includes an rotation shaft 91a; a sheet grip part 91b as a sliding body retaining part that is formed integrally with the rotation shaft 91a, and by extending in the longitudinal direction along the rotation shaft 91a, and that spins around the rotation shaft 91a in association with the rotation shaft 91a; and an agitation sheet 50 made of a resin that is retained by the sheet grip part 91b and the that has plasticity. When the sheet grip part 91b spins, the tip of the agitation sheet 50 slides on the inner wall of a case 40a (FIG. 3).

Then, the rotation shaft 91a includes an axial body part 91ad, a rotation shaft end part 91ag as a first supported part, a disc-shape sealing part 91af, a ring-shape part 99, a cylindrical rotation shaft end part 91ag as a second supported part, a prismatic fitting part 91ah, and the like. The rotation shaft end part 91ag is formed in the end at the side cover 40b (FIG. 4) side as a cover body of the axial body part 91ad, and is supported by the bearing part 40d as a bearing element. The disc-shape sealing part 91af is formed by abutting the sealing member 45 to the end part at the main body part 42a side of the operational lever 42 in the axial body part 91ad, and slides onto the sealing member 45 in association with the rotation of the rotation shaft 91a. The ring-shape part 99 is formed by adjoining the sealing part 91af in the end part at the main body part 42a side farther than the sealing part 91af. The cylindrical rotation shaft end part 91ag is formed by adjoining the ring-shape part 99 in the end part at the main body part 42a side farther than the ring-shape part 99, and is supported by the axial support hole h1. The prismatic fitting part 91ah is formed at the end part at the main body part 42a side farther than the rotation shaft end part 91ag by adjoining the rotation shaft end part 91ag, and is fitted into the agitation drive gear 92.

When diameters of the sealing part 91af, the ring-shape part 99, the rotation shaft part 91ag and the body part 91ad are indicated as d11, d12, d13 and d14, respectively, the diameters d11 to d14 are set as d11>d12>d13>d14.

Further, when the fitting part 91ah is formed to have dimensions to be fitted within the outer periphery of the rotation shaft end part 91ag and to have a deformed rectangular cross-sectional configuration, and when a length of each side of the deformed rectangle is e11, the relationship d13 e11>d14 is established. Therefore, steps are respectively formed between the sealing part 91af and the ring-shape part 99, between the ring-shape part 99 and the rotation shaft end part 91ag and between the rotation shaft end part 91ag and the fitting part 91ah, respectively.

In the present embodiment, the agitation drive gear 92 and the toner agitation bar 91 are disengageably arranged.

Consequently, the agitation drive gear 92 includes the ring-shape boss part 65 arranged in the center portion, the mesh part 63 made from a plurality of teeth (not shown) arranged around the outer periphery, and the hub part 64 formed between the boss part 65 and the mesh part 63. An axial support hole h12 that supports the rotation shaft end part 91ag and a fitting hole h13 having a rectangular configuration for fitting the fitting part 91ah are formed in the boss part 65 in the radially inward direction. An axial support receiving part 92a that abuts the rotation shaft end part 91ag is formed on the inner peripheral surface of the axial support hole h12, and a rotation transmission surface 92b that abuts the later-discussed rotation transmission receiving surface 97 is formed on the inner peripheral surface of the fitting hole h13.

The fitting hole h13 is composed of three surfaces s31 to s33 situated away from the rotation center by a distance R and a rotation transmission surface 92b situated away from the rotation center by a distance r. A snap fit part 93 as a locking member extends in the axial direction on the surface s31 that faces the rotation transmission surface 92b and is formed in a tongue shape.

The snap fit part 93 includes a flat tabular body part 93b which the surface is formed with a flat surface; and a latch pawl 93a as a first locking element formed by protruding from the vicinity of the end on the inner side surface of the body part 93b. Furthermore, both a base edge line part 93c with regard to the boss part 65 of the snap fit part 93 and a base edge line part 93d with regard to the body part 93b of the latch pawl 93a are linearly formed without any curvature throughout the length of the rectangle of the fitting hole h13 in the rotational tangential direction of the agitation drive gear 92.

On one section of the tip of the fitting part 91ah (the curved surface in the present embodiment), a locking groove 96 as a second locking element is formed without curvature in the rotational tangential direction of the toner agitation bar 91, and the groove surface 96a as a bottom surface of the locking groove 96 is formed without curvature and forms a flat horizontal surface by being linearly extended. Further, the rotation transmission receiving surface 97 as a third locking element and as a first plane surface portion is linearly formed on a surface of the fitting part 91ah that is at the opposite side from the surface on which the locking groove 96 is formed, and the rotation from the agitation drive gear 92 is transmitted to the toner agitation bar 91 by the rotation transmission receiving surface 97 and the locking groove 96.

The fitting part 91ah includes a small arc surface 95 having a sector angle at 90° with radius r with regard to the rotation center of the toner agitation bar 91 as axially seen from the agitation drive gear 92 side; the rotation transmission receiving surface 97 formed by extending at the downstream side in the tangential direction and in the rotational direction, from one end of the small arc surface 95; a rotation regulation surface 98 as a second plane surface portion formed by extending at the upstream side in the tangential direction, and, in the rotational direction from the other end of the small arc surface 95; and a large arc surface 94 as a curved surface portion that is formed by facing to the small arc surface 95 and that has a sector angle with a radius R (>r) with regard to the rotation center of the toner agitation bar 91 and with an extent to portions to intersect with the rotation transmission receiving surface 97 and the rotation regulating surface 98. The distance (radius) R from the rotation center of the large arc surface 94 is greater than the distance (radius) r from the rotation center of the small arc surface 95, the rotation transmission receiving surface 97 and the rotation regulating surface 98. The locking groove 96 is formed by curving a portion of the large arc surface 94. Furthermore, a tapered surface tp11 is formed in the tip of the fitting part 91ah of the large arc surface 94.

In the present embodiment, an inner side surface s11 as a locking surface in the tip side of the fitting part 91ah in the locking groove 96 is formed by being orthogonal to the axis of the toner agitation bar 91.

Furthermore, the inner side surface s11 is formed by inclining at the predetermined angle α (0°<α≤30°) toward the rotation shaft end part 91ag with regard to the surface that is orthogonal to the axis of the toner agitation bar 91.

Further, an outer side surface s13 as a locking surface at the tip side of the snap fit part 93 in the latch pawl 93a is formed by being orthogonal to the shaft of the toner agitation bar 91.

Furthermore, the outer side surface s13 is formed by inclining at the predetermined angle β (0°<α≤30°) toward the tip side with regard to the surface that is orthogonal to the axis of the toner agitation bar 91.

Therefore, if the tip, which is an outmost periphery portion of the inner side surface s11, and the tip, which is an outmost periphery portion of the outer side surface s13, form an acute angle by inclining the inner side surface s11 at the angle α and by inclining the outer side surface s13 at the angle β, the latch pawl 93a and the locking groove 96 are reliably locked, even if an external force is applied to the direction in which the agitation drive gear 92 and the toner agitation bar 91 are separated, because a force to clasp the latch pawl 83a into the locking groove 96 is generated.

Figure 20:
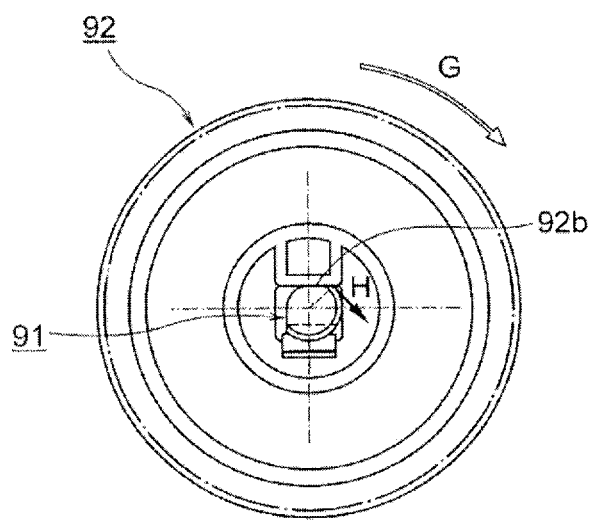
FIG. 20 is a diagram showing a transmission state of rotation by the rotation transmission unit in the second embodiment of the present application.

Next, the rotation transmission state by the rotation transmission unit is explained with reference to FIG. 20.

In this case, the rotational axes of the agitation drive gear 92 and the toner agitation bar 91 are determined by the rotation shaft end part 91ag and the axis support receiving part 92a, respectively. As shown in the figures, when the agitation drive gear 92 is rotated to the arrow G direction due to reception of the rotation from the motor as a drive part, the rotation transmission surface 92b applies a rotational force IT to the rotation transmission receiving surface 97.

Figure 21:
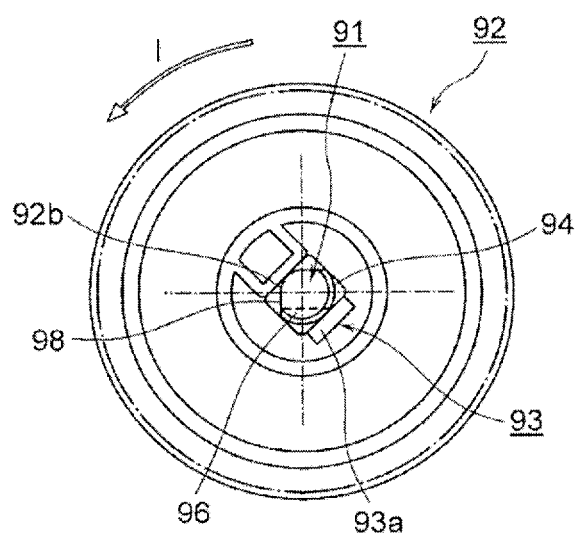
FIG. 21 is a first diagram for explaining a disassembly method for the rotation transmission unit in the second embodiment of the present application.
Figure 22:
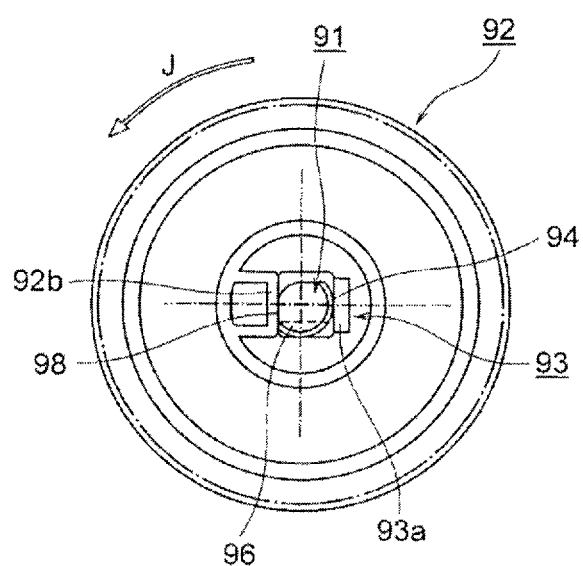
FIG. 22 is a second diagram for explaining a disassembly method for the rotation transmission unit in the second embodiment of the present application.
Figure 23A:
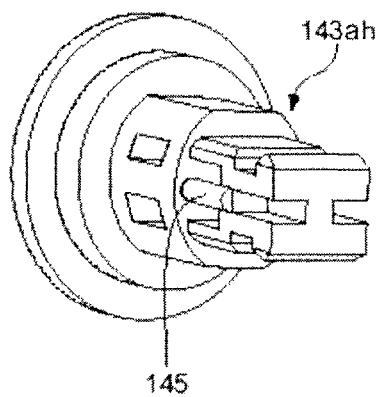
FIGS. 23A to 23D are diagrams showing an insertion part in the first embodiment of the present application.
Figure 23B:
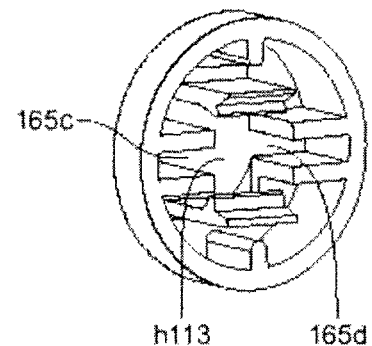
Figure 23C:
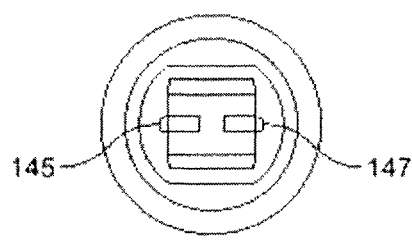
Figure 23D:
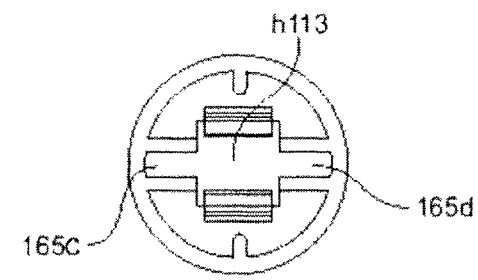

Next, a disassembly method for the rotation transmission unit is explained with references to FIGS. 21 and 22.

As shown in FIGS. 21 and 22, when the agitation drive gear 92 is rotated in the arrow direction I or J (opposite direction from the rotation transmission direction by motor) with regard to the toner agitation bar 91, the latch pawl 93a locked with the locking groove 96 runs on the large arc surface 94 from the end part of the locking groove 96 while bending the snap fit part 93.

Then, when the rotation transmission surface 92b abuts the rotation regulating surface 98 at which the agitation drive gear 92 is rotated for 90° with regard to the toner agitation bar 91, the further rotation is restricted. At this time, since the latch pawl 93a completely runs on the large arc surface 94, and since the locking with the locking groove 96 is released, the engagement of the agitation drive gear 92 with the toner agitation bar 91 is released by removing the toner agitation bar 91 from the agitation drive gear 92.

Furthermore, since the latch pawl 93a and the locking groove 96 maintain the locked state due to a biasing force of the snap fit part 93, the agitation drive gear 92 is not rotated in the arrow direction I or J with regard to the toner agitation bar 91 during transportation of the printer as the image forming device. Therefore, the engagement of the agitation drive gear 92 with the toner agitation bar 91 is not released.

Consequently, in the present embodiment, since the base edge line part 93c of the snap fit part 93 in the agitation drive gear 92 is linearly extended, the disengagement of the toner agitation bar 91 from the agitation drive gear 92 is prevented even if an external force is applied in the direction in which the fitting part 91ah is detached from the fitting hole h13 due to vibration or impact after the latch pawl 93a and the locking groove 96 are locked. Further, since the groove surface 96a of the locking groove 96 is linearly formed, the disengagement of the toner agitation bar 91 from the agitation drive gear 92 is further prevented.

In addition, since the base edge line part 93c of the snap fit part 93 is linearly extended, rigidity of the toner agitation bar 91 is lowered, and thereby, the snap fit part 93 is easily flexibly deformed. As a result, workability at the time of engaging/disengaging the agitation drive gear 92 with/from the toner agitation bar 91 is enhanced.

Figure 13:
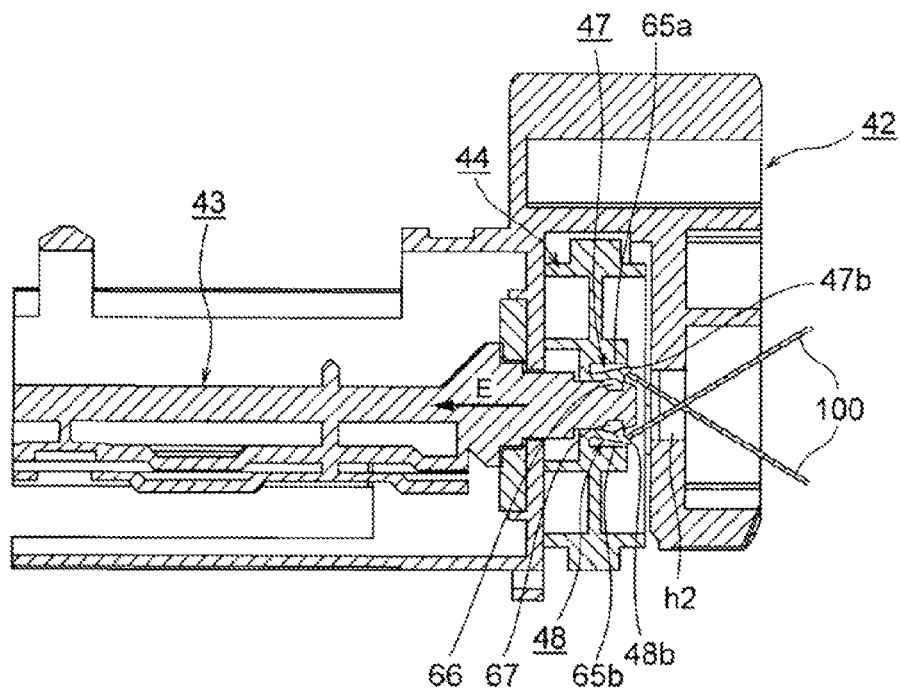
FIG. 13 is a diagram for explaining a disassembly method for the rotation transmission unit in the first embodiment of the present application.
Figure 14:
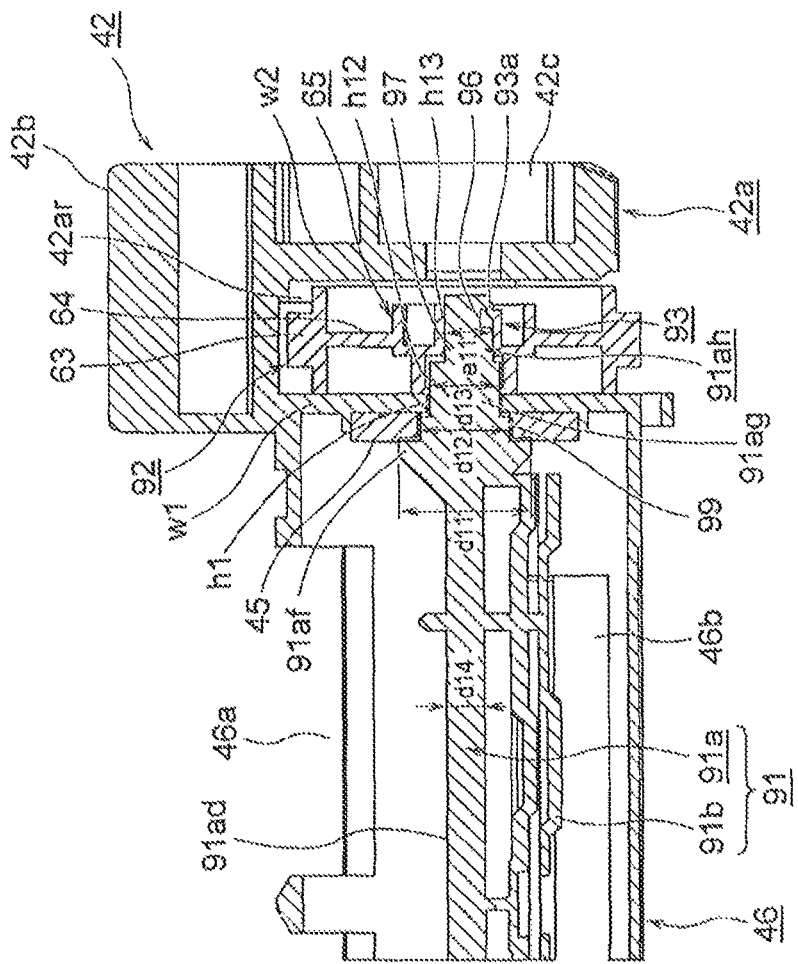
FIG. 14 is a cross-sectional view showing a main part of a toner cartridge in a second embodiment of the present application.
Figure 15:
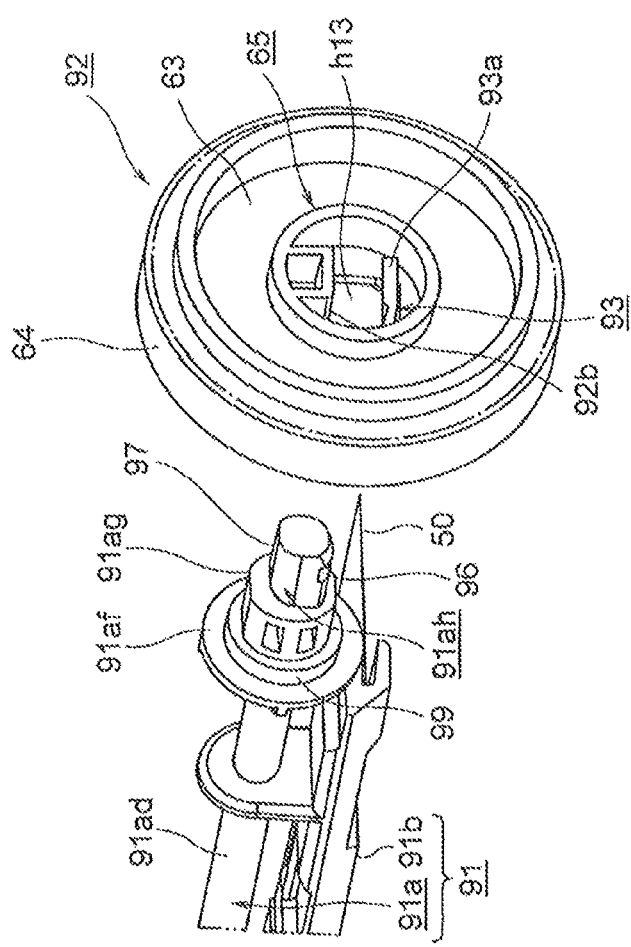
FIG. 15 is an exploded cross-sectional view of the rotation transmission unit in the second embodiment of the present application.
Figure 16:
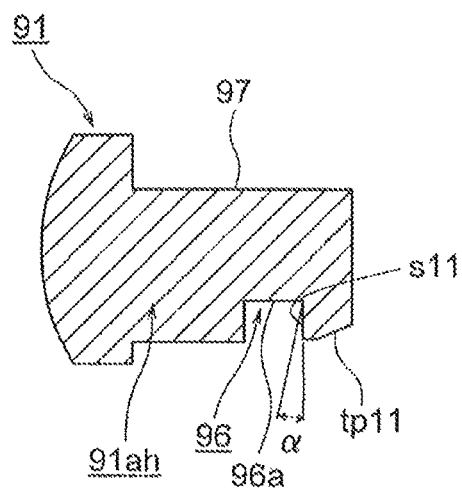
FIG. 16 is a cross-sectional view showing a main part of the toner agitation bar in the second embodiment of the present application.
Figure 17:
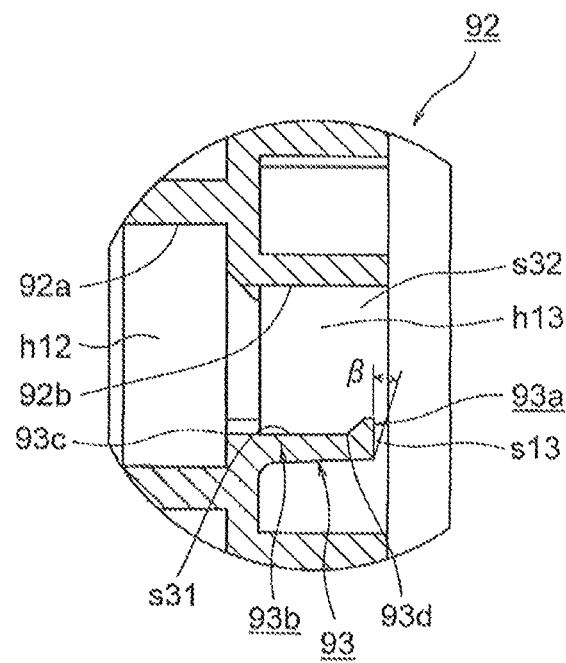
FIG. 17 is a cross-sectional view showing a main part of an agitation drive gear in the second embodiment of the present application.
Figure 18:
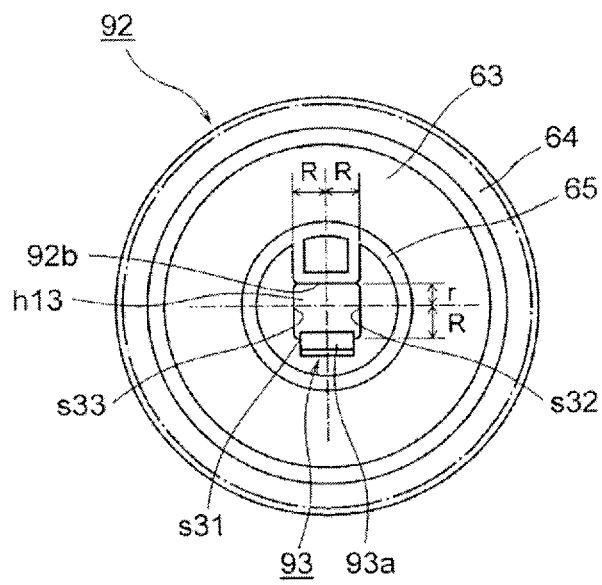
FIG. 18 is a front view of the agitation drive gear in the second embodiment of the present application.
Figure 19:
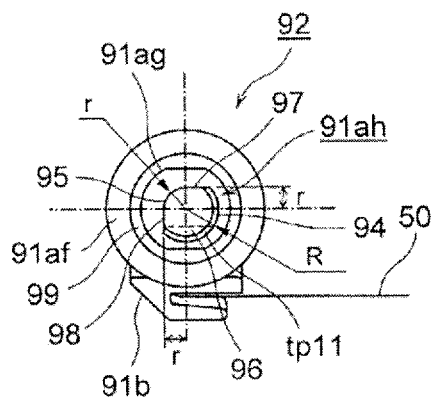
FIG. 19 is a front view showing a main part of the toner agitation bar in the second embodiment of the present application.

Further, since the locking of the latch pawl 93a and the locking grove 96 is released by rotating the agitation drive gear 92 in the opposite direction from the rotation transmission direction by motor with regard to the toner agitation bar 91, the engagement of the agitation drive gear 92 with the toner agitation bar 91 is easily released without using the operational tool 100 (FIG. 13).

In each of the embodiments, a printer is explained. However, the present embodiments can be applied to a photocopy machine, a facsimile device, a multifunction peripheral and the like.

Further, in each of the embodiments, the rotation transmission unit is arranged in a toner cartridge. However, the rotation transmission unit can also be arranged in a development device, a waste toner accommodation device, a transfer unit and the like.

Furthermore, the present application is not limited to each of the embodiments. However, it is possible to variously modify the embodiments based upon the concept of the present application. Such modification shall not be eliminated from the scope of the present application.

What is claimed is:
1. A rotation transmission unit, comprising:
a driving unit that provides a rotational power;
a rotation transmission member that is rotated due to reception of the rotational power transmitted from the driving unit;
a rotation member that is rotated due to reception of a rotation of the rotation transmission member, wherein
the rotation transmission member includes
a fitting hole,
a pair of locking members that are arranged on the fitting hole,
latch pawls that are provided on and are integrally formed with corresponding one of the pair of locking members on a downstream side of an insertion direction of the rotation member, and
first flat surfaces that each extends on and are integrally formed with corresponding one of the pair of locking members on an upstream side of the insertion direction of the rotation member,
the rotation member includes
a fitting part that is to be fitted in the fitting hole,
a pair of locking grooves, and
second flat surfaces that each face corresponding one of the first flat surfaces and corresponding one of the latch pawls on the pair of locking members of the rotation transmission member, each of the locking grooves being formed on corresponding one of the second flat surfaces,
the latch pawls and the locking grooves are formed to face each other,
a tip part of the fitting part has an approximately rectangular shape and includes
the second flat surfaces that are opposite from each other, and two contact surfaces that are flat and formed perpendicularly with the second flat surfaces,
ribs are provided on the rotation transmission member and each face corresponding one of the two contact surfaces of the fitting part, and
each of the ribs has a flat end that surface-contacts with the corresponding one of the two contact surfaces of the fitting part.

2. The rotation transmission unit according to claim 1, wherein
a groove surface of the locking groove linearly extends.

3. The rotation transmission unit according to claim 1, wherein
each of the pair of the locking members is engaged with corresponding one of the pair of the locking grooves when the fitting part is inserted into the fitting hole.

4. The rotation transmission unit according to claim 1, wherein
the rotation member includes a rotation shaft end part,
the fitting part is formed closer to an end of the rotation member than the rotation shaft end part, so that the rotation shaft end part and the fitting part adjoin each other,
a diameter of the rotation member is greater than that of the fitting part with a step created therebetween, and relative movement of the rotation transmission member and the rotation member in axial directions of the rotation transmission member and the rotation member is regulated by the step.

5. The rotation transmission unit according to claim 1, wherein
each of the pair of the locking members includes a locking surface formed on the latch pawl; and
the locking surface is formed by inclining at a predetermined angle with regard to a surface that is orthogonal to rotation axes of the rotation transmission member and the rotation member.

6. The rotation transmission unit according to claim 5, wherein
the predetermined angle is an acute angle.

7. A replacement unit, comprising:
the rotation transmission unit according to claim 1.

8. A developer container, comprising:
the rotation transmission unit according to claim 1.

9. The developer container according to claim 8, further comprising:
a developer accommodation part in which a developer is accommodated, wherein
the rotation transmission unit is installed in the developer accommodation part.

10. The developer container according to claim 9, wherein
the rotation member of the rotation transmission unit extends from one end to the other end of the developer accommodation part in its longitudinal direction.

11. The developer container according to claim 9, wherein
the rotation member is rotatable around an axis that is oriented in the substantially same direction as the longitudinal direction of the developer accommodation part.

12. The developer container according to claim 9, wherein
the rotation member has a rotational shaft and an agitation member that agitates the developer within the developer accommodation part.

13. An image forming device, comprising:
the developer container according to claim 8.

14. The rotation transmission unit according to claim 1, wherein
a rectangular cross-sectional configuration of the fitting part includes a curved corner portion at a location where one of the second flat surfaces and one of the contact surfaces that adjoin each other.

15. The rotation transmission unit according to claim 14, wherein
a distance of the curved corner portion from a rotation center of the rotation member is greater than a distance of the one of the second flat surfaces or the one of the contact surfaces from the rotation center of the rotation member.

16. The rotation transmission unit according to claim 1, wherein
the rotation member includes a stepped section having a plurality of stepped parts, and
the plurality of stepped parts increase diameters from the downstream side to the upstream side of the insertion direction of the rotation member into the rotation transmission member.

17. The rotation transmission unit according to claim 1, wherein
each of the ribs include a first rib and a second rib, and
the first rib and the second rib are connected with each other on one end via an end part and separated from each other on the other end.

18. The rotation transmission unit according to claim 1, wherein
the pair of locking members and the ribs extend from an inner wall of the rotation transmission member on the downstream side in the insertion direction of the rotation member.

19. The rotation transmission unit according to claim 1, wherein
the rotation member includes tapered surfaces each provided on the downstream side of a corresponding one of the pair of locking grooves in the insertion direction of the rotation member.

20. The rotation transmission unit according to claim 1, wherein
each of the latch pawls have a tapered surface on the upstream side of the latch pawls in the insertion direction of the rotation member.

21. A rotation transmission unit, comprising:
a driving unit that provides a rotational power;
a rotation transmission member that is rotated due to reception of the rotational power transmitted from the driving unit;
a rotation member that is rotated due to reception of a rotation of the rotation transmission member, wherein
one of the rotation transmission member and the rotation member includes
a fitting hole,
a pair of locking members that are arranged on the fitting hole,
latch pawls that are provided on and are integrally formed with corresponding one of the pair of locking members on a downstream side of an insertion direction of the one of the rotation member and the rotation transmission member into the other one of the rotation member and the rotation transmission member, and
first flat surfaces that each extends on and are integrally formed with corresponding one of the pair of locking members on a upstream side of the insertion direction of the rotation member and the rotation transmission member into the other one of the rotation member and the rotation transmission member, the other one of the rotation transmission member and the rotation member includes
> a fitting part that is to be fitted in the fitting hole,
> a pair of locking grooves, and
> second flat surfaces that each face corresponding one of the first flat surfaces and corresponding one of the latch pawls on the pair of locking members, each of the locking grooves being formed on corresponding one of the second flat surfaces, the latch pawls and the locking grooves are formed to face each other, a tip part of the fitting part has an approximately rectangular shape and includes
> the second flat surfaces that are opposite from each other, and
> at least a third surface that is formed between the second flat surfaces, a first groove part is formed on a center of the third surface of the fitting part and extends in the insertion direction of the one of the rotation member and the rotation transmission member into the other one of the rotation member and the rotation transmission member, first contact parts are formed on the third surface of the fitting part and on both sides of the first groove part, the rotation transmission member includes first ribs that are formed to face the first contact parts on the third surface, and each of the first ribs has a flat end that surface-contacts with the corresponding one of the first contact parts of the fitting part.

22. The rotation transmission unit according to claim 21, wherein
> the tip part of the fitting part includes a fourth surface that is opposite from the third surface,
> a second groove part is formed on a center of the fourth surface of the fitting part and extends in the insertion direction of the rotation member and the rotation transmission member into the other one of the rotation member and the rotation transmission member,
> second contact parts are formed on the fourth surface of the fitting part and on both sides of the second groove part,
> the rotation transmission member includes second ribs that are formed to face the second contact parts on the fourth surface, and
> each of the second ribs has a flat end that surface-contacts with the corresponding one of the second contact parts of the fitting part.

* * * * *